United States Patent
McGee et al.

(10) Patent No.: US 6,581,883 B2
(45) Date of Patent: Jun. 24, 2003

(54) EXTENDABLE/RETRACTABLE BI-FOLD SOLAR ARRAY

(75) Inventors: Billy W. McGee, La Mirada, CA (US); Bryan V. Keeler, Orange, CA (US); James Q. Pfister, Angelus Oaks, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/905,544

(22) Filed: Jul. 13, 2001

(65) Prior Publication Data
US 2003/0015625 A1 Jan. 23, 2003

(51) Int. Cl.⁷ ................................................ B64G 1/44
(52) U.S. Cl. ....................................... 244/173; 136/245
(58) Field of Search ............................. 244/173, 158 R; 136/245, 292

(56) References Cited

U.S. PATENT DOCUMENTS

| | | | |
|---|---|---|---|
| 3,326,497 A | | 6/1967 | Michelson |
| 3,698,958 A | * | 10/1972 | Williamson et al. |
| 4,133,501 A | | 1/1979 | Pentlicki |
| 4,133,502 A | * | 1/1979 | Anchutin |
| 4,384,163 A | | 5/1983 | Rauschenbach et al. |
| 4,394,529 A | | 7/1983 | Gounder |
| 4,554,038 A | | 11/1985 | Allard |
| 4,630,791 A | * | 12/1986 | Chapman |
| 4,725,025 A | | 2/1988 | Binge et al. |
| 4,747,567 A | | 5/1988 | Johnson et al. |
| 4,755,231 A | | 7/1988 | Kurland et al. |
| 4,834,325 A | * | 5/1989 | Faget et al. |
| 4,964,596 A | * | 10/1990 | Ganssle et al. |
| 4,988,060 A | * | 1/1991 | Janson et al. |
| 5,096,505 A | | 3/1992 | Fraas et al. |
| 5,131,955 A | | 7/1992 | Stern et al. |
| 5,145,130 A | * | 9/1992 | Purves |
| 5,228,644 A | * | 7/1993 | Garriott et al. |
| 5,319,905 A | | 6/1994 | Szirtes |
| 5,335,881 A | * | 8/1994 | Zaguli |
| 5,487,791 A | | 1/1996 | Everman et al. |
| 5,520,747 A | | 5/1996 | Marks |
| 5,578,139 A | | 11/1996 | Jones et al. |
| 5,620,529 A | | 4/1997 | Bassily et al. |
| 5,660,644 A | | 8/1997 | Clemens |
| 5,720,452 A | | 2/1998 | Mutschler, Jr. |
| 5,785,280 A | | 7/1998 | Baghdasarian |
| 5,833,176 A | | 11/1998 | Rubin et al. |
| 5,885,367 A | | 3/1999 | Brown et al. |
| 5,961,738 A | | 10/1999 | Benton et al. |

FOREIGN PATENT DOCUMENTS

GB          2103011    * 12/1982    .................. 244/173

OTHER PUBLICATIONS

De Kam, J., *Retractable Advanced Rigid Array*, 1988, pp. 860–867, IEEE.

* cited by examiner

*Primary Examiner*—Tien Dinh
(74) *Attorney, Agent, or Firm*—DiPinto & Shimokaji, P.C.

(57) ABSTRACT

A solar cell array assembly that is configured to be stowed in the payload bay of a low earth orbit space vehicle utilizes hinged panels comprising foldable outboard panels and inboard panels. The inboard panels are connected along their respective facing edges to an elongated structural boom one end of which is affixed to a deployment arm. The deployment arm has a shoulder connected to the payload bay, an upper arm, an elbow joint and a fore arm. The fore arm provides two rotational drives having respectively orthogonal axes. The panels are shaped to conform to the shape of the hinged payload bay doors which load the panels in the stowed configuration. The Complete Solar array assembly is a six degree of freedom mechanism that articulates the cell substrates out of a stowed volume (payload bay) to a selected orientation for solar array articulation relative to the sun, optimum power generation, and mission operations.

29 Claims, 10 Drawing Sheets

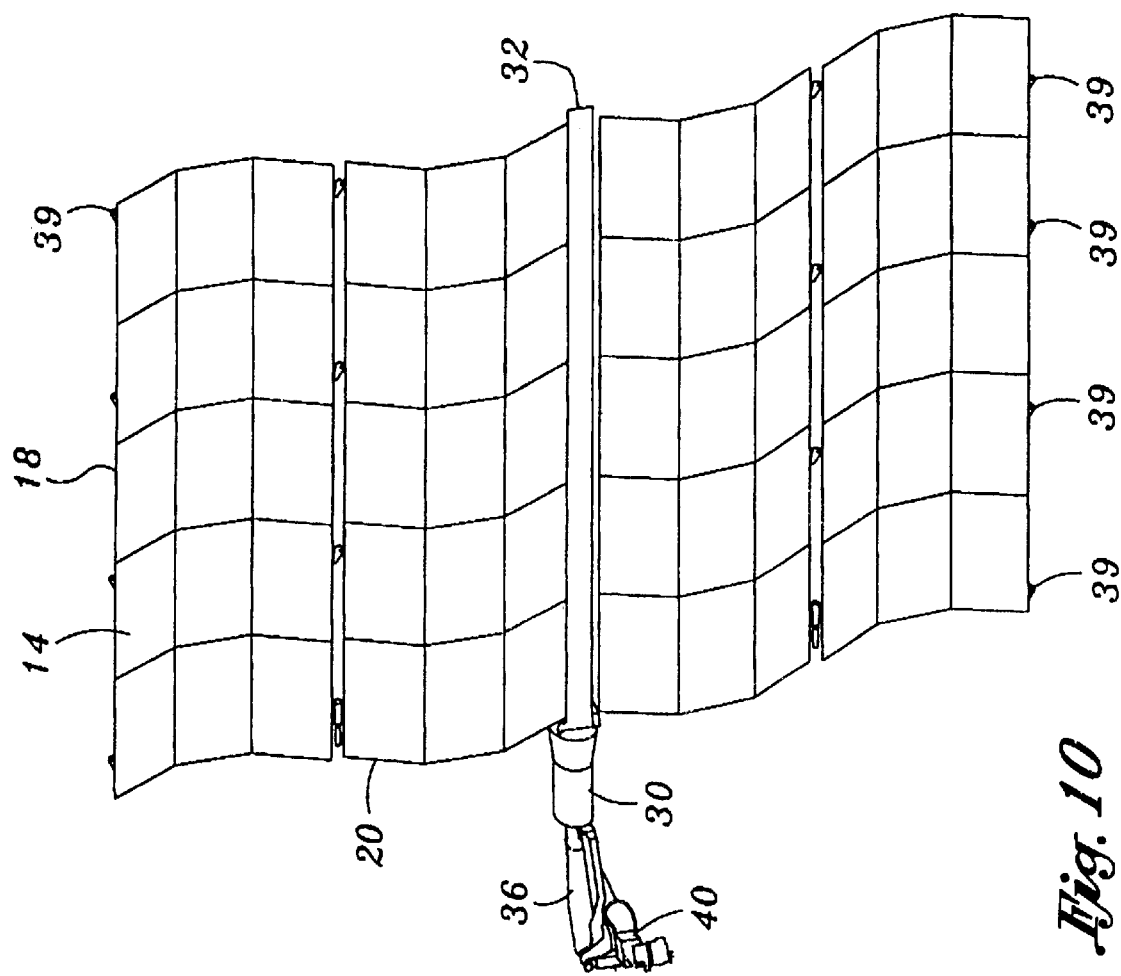

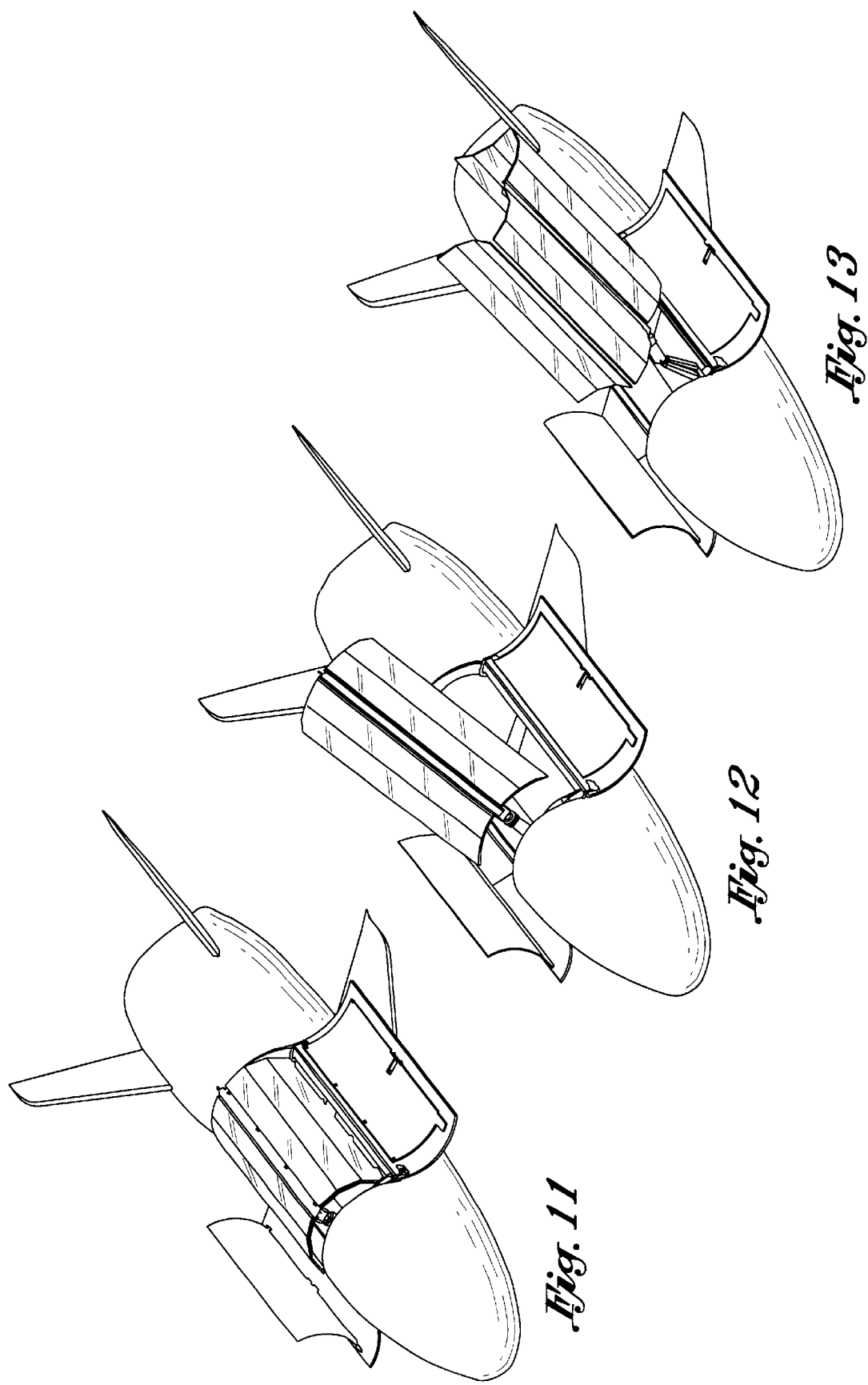

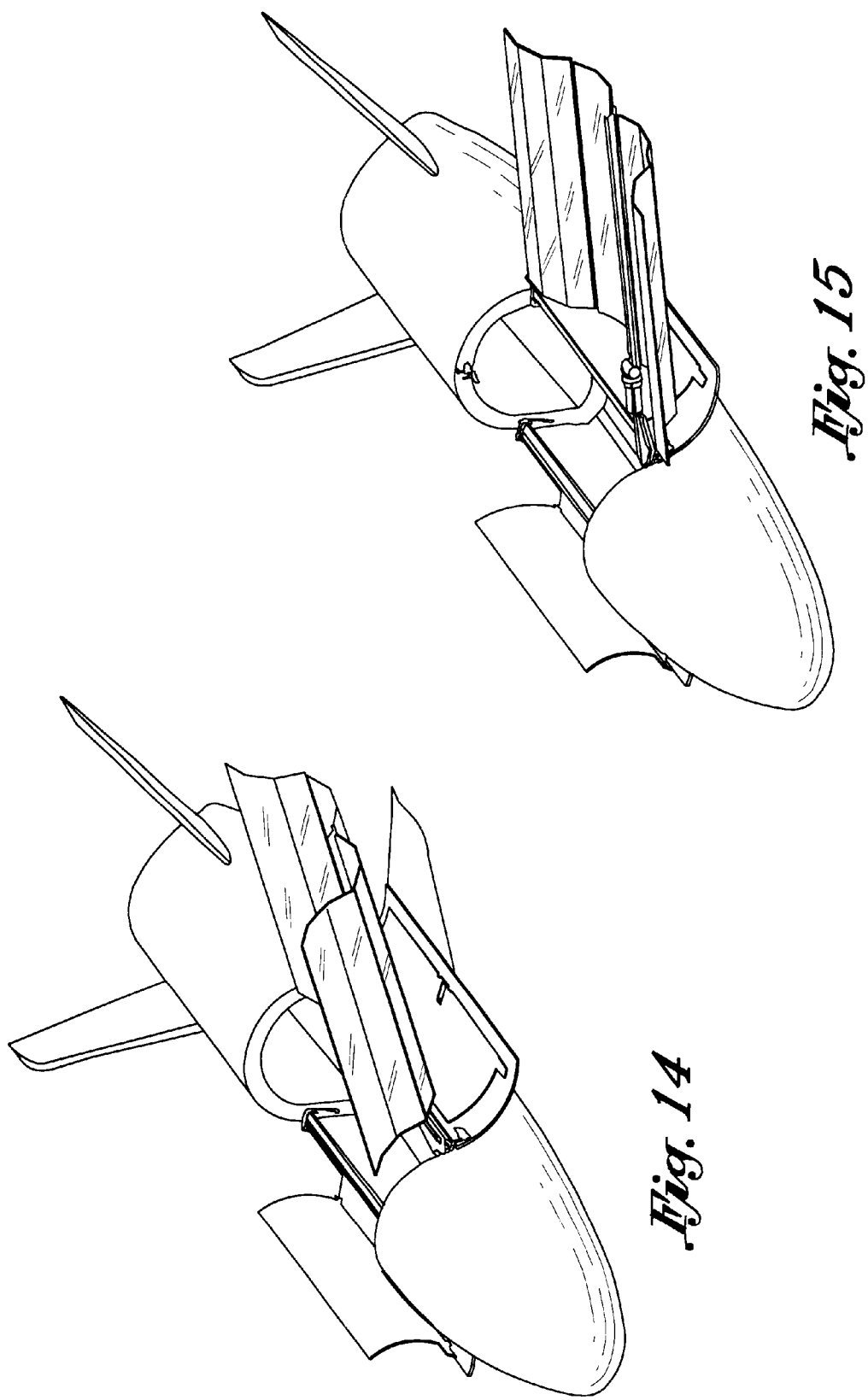

EXTENDABLE/RETRACTABLE BI-FOLD SOLAR ARRAY

GOVERNMENT RIGHTS

The invention described herein was made with Government support. The Government has certain rights in this invention.

BACKGROUND OF THE INVENTION

The present invention relates to a highly integrated solar array wing capable of survival in a low-earth-orbit (LEO) environment and capable of multiple deploy/restow cycles per mission and multiple mission capability without refurbishment.

Current solar array designs that possess restow capability are limited to flexible solar cell substrates that are subject to atomic oxygen erosion and contain complex mechanization to re-fold the array into the stowed volume. All of the arrays of this type are not intended or designed for complete re-stow and re-use.

Compact retractable arrays consist of photovoltaic cells mounted to flexible substrates. LEO missions must address damage to the substrate resulting from exposure to atomic oxygen over time. Additionally, the flexible substrates must fold in a predictable fashion to assure that cell damage does not occur during the stow cycle. Controlling the fold lines requires very complex mechanical elements that diminish operational reliability. No known prior art system has been designed for complete re-use and multi-mission capability. Some military satellite systems would benefit from the ability to completely re-stow because this would offer mission flexibility to move the satellite thus making its orbit unpredictable.

U.S. Pat. No. 3,326,497 for Solar Cell Array discloses a solar cell array panel used on space vehicles. The array is actually deployed on a number of hinged panels so that the array may be folded compactly and stowed on the side of the space vehicle. When fully extended, the hinged panels may be rotated to orient the surface of the solar cells perpendicular to the impinging light rays.

U.S. Pat. No. 4,384,163 for Ultra Lightweight Folding Panel Structure discloses an un-foldable planar solar cell array which may be deployed from the cargo bay of a space shuttle using an extendable boom.

An article published by IEEE in 1988 and entitled "Retractable Advanced Rigid Array" by J. DeKam, describes a retractable solar array for use on satellites which may be stowed in the cargo bay of a space shuttle for deployment and retrieval in low earth orbit.

As can be seen, there is a need for a foldable, non-flexible solar cell array that may be stowed in the payload bay of a reusable space vehicle without using a significant amount of storage volume.

SUMMARY OF THE INVENTION

The present invention provides a deployable/foldable solar cell array which provides a solution for a robust solid substrate design. The complete Solar Array Assembly (SAA) is a six degree of freedom (6DOF) mechanism that articulates the cell substrates out of a stowed volume (payload bay) to a determined orientation for solar array articulation relative to the sun, optimum power generation, and mission operations. This array is designed for multiple usage on a reusable space plane such as Boeing's X-37 and SMV projects. It incorporates motor deployment of four panels and a solar array boom which may be stowed in the vehicle's payload bay. This system is designed for multiple Deploy and Re-Stow over the life of a 40 mission SMV (Space Maneuver Vehicle). The packaging of the array is unique in that it takes only 6.6 cubic feet in the payload bay of the X-37/SMV. The stowing latches that are normally required for solar array systems are not necessary as the inventive array is passively stowed on fixed snubbers and the system employs a unique integral door design for preloading the stowed assembly when the payload bay doors are selectively closed to enclose the solar array assembly.

The invention comprises the following major elements in one embodiment:

| | |
|---|---|
| Four Solar Array Substrates (4) Panels | (2 Inboard & 2 Outboard) |
| Passive Panel Hinges with Passive Rollers | (12 Required) |
| Active Hinges and Motor Drives | (4 Required) |
| Array Boom (or Spine) | (1 Required) |
| Solar Array Arm Assy (Kinematic Arm) | (1 Required) |
| SADPT Two Axis Drive | (1 Required) |
| Kinematic Deployment Drive | (1 Required) |
| Arm Support Assy | (1 Required) |
| Arm Separation Assy | (1 Required) |
| Rubber Bumper (Door) | (16 Required) |
| V-Guide Snubbers | (8 Required) |
| Aft Capture Latch Assy | (1 Required) |
| Forward Capture Guide | (1 Required) |

The four panels are shaped to be substantially congruent to the payload bay doors when the panels are folded in their stowed configurations. Two inboard panels are connected on each of their respective facing edges to a symmetrically located, elongated structural boom extending along substantially the entire length of the panels.

The solar array arm deployment is carried out in a coordinated set of moves that are preprogrammed into the flight software. Go/No Go position switches and sensors are employed for proper sequencing. The array, once deployed off to the side of the spacecraft, has a two-axis drive (SADPT) that can be mission scenario driven in two distinct orthogonal axes of rotation (Alpha and Beta).

The inventive design offers a reliable solution that meets the program requirements. To date, no aerospace company has apparently produced a multiple use restowable array design for a reusable unmanned spacecraft/space plane. Its applications could also prove beneficial to satellite missions for quick orbit modification for planned mission unpredictability.

BRIEF DESCRIPTION OF THE DRAWINGS

FIG. 10 is an enlarged view of the solar array in its deployed configuration; and FIGS. 11–15 are sequential views of intermediate steps in the deployment of the solar array.

DETAILED DESCRIPTION OF THE INVENTION

The following detailed description is for the best currently contemplated modes for carrying out the invention. The description is not to be taken in a limiting sense, but is made merely for the purpose of illustrating the general principles of the invention.

Although the present invention is described in the context of a space vehicle, the invention is not so limited. As an example, the present invention contemplates use for terrestrial vehicles and aircraft.

Figure 1:
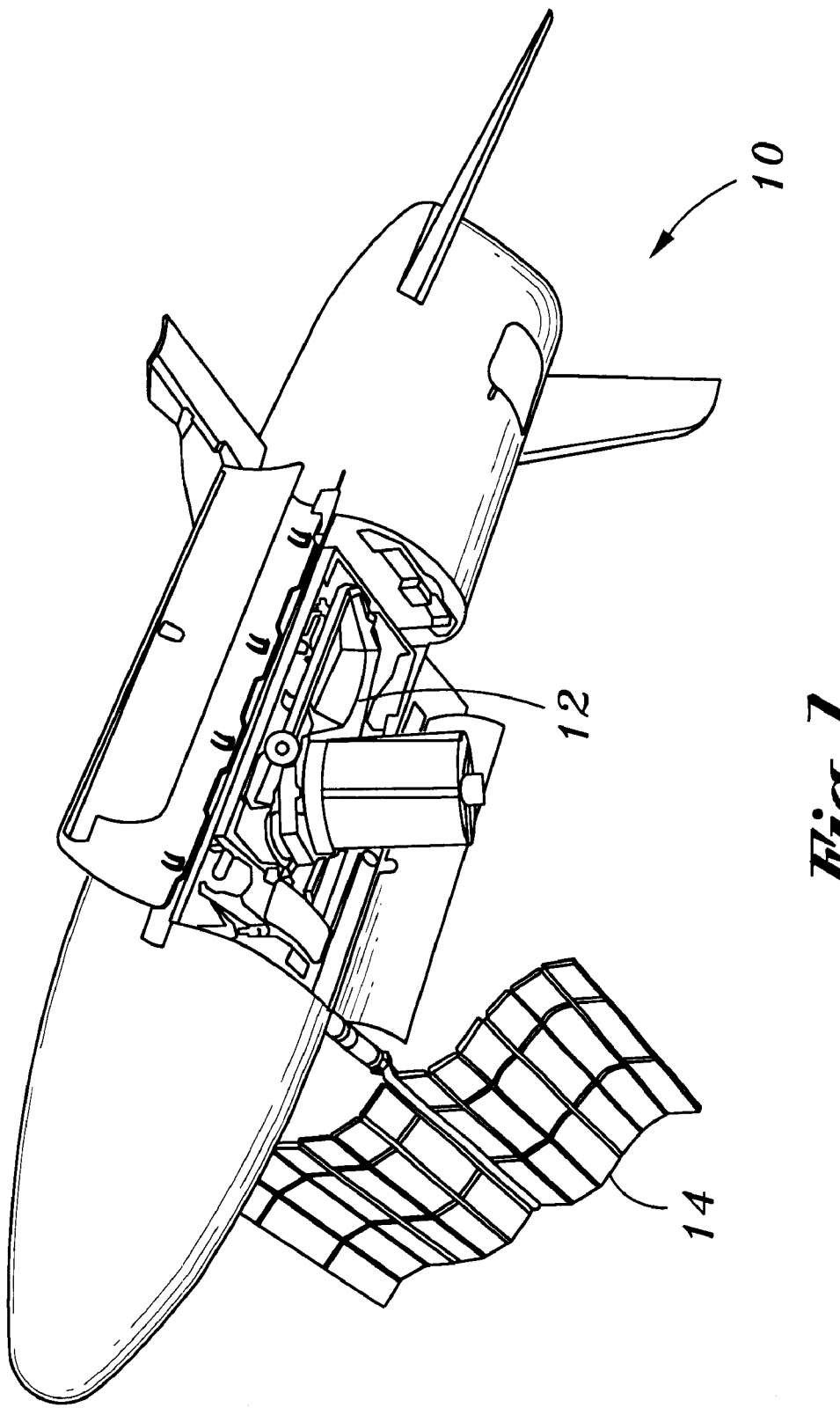
FIG. 1 is a three-dimensional view of a re-usable space vehicle shown with the solar array of the invention in its fully deployed configuration.
Figure 2:
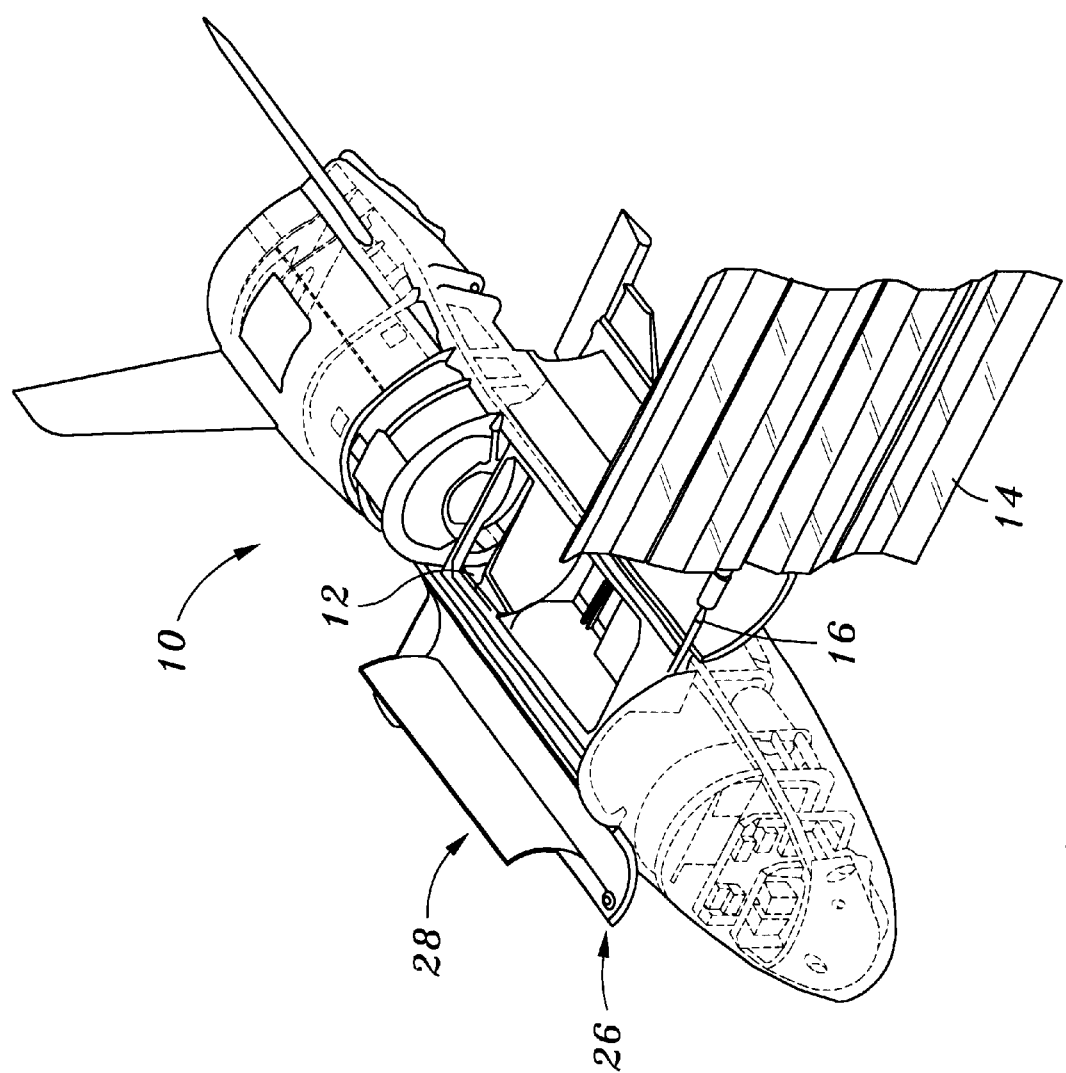
FIG. 2 is a view similar to FIG. 1, but taken from a different angle.
Figure 3:
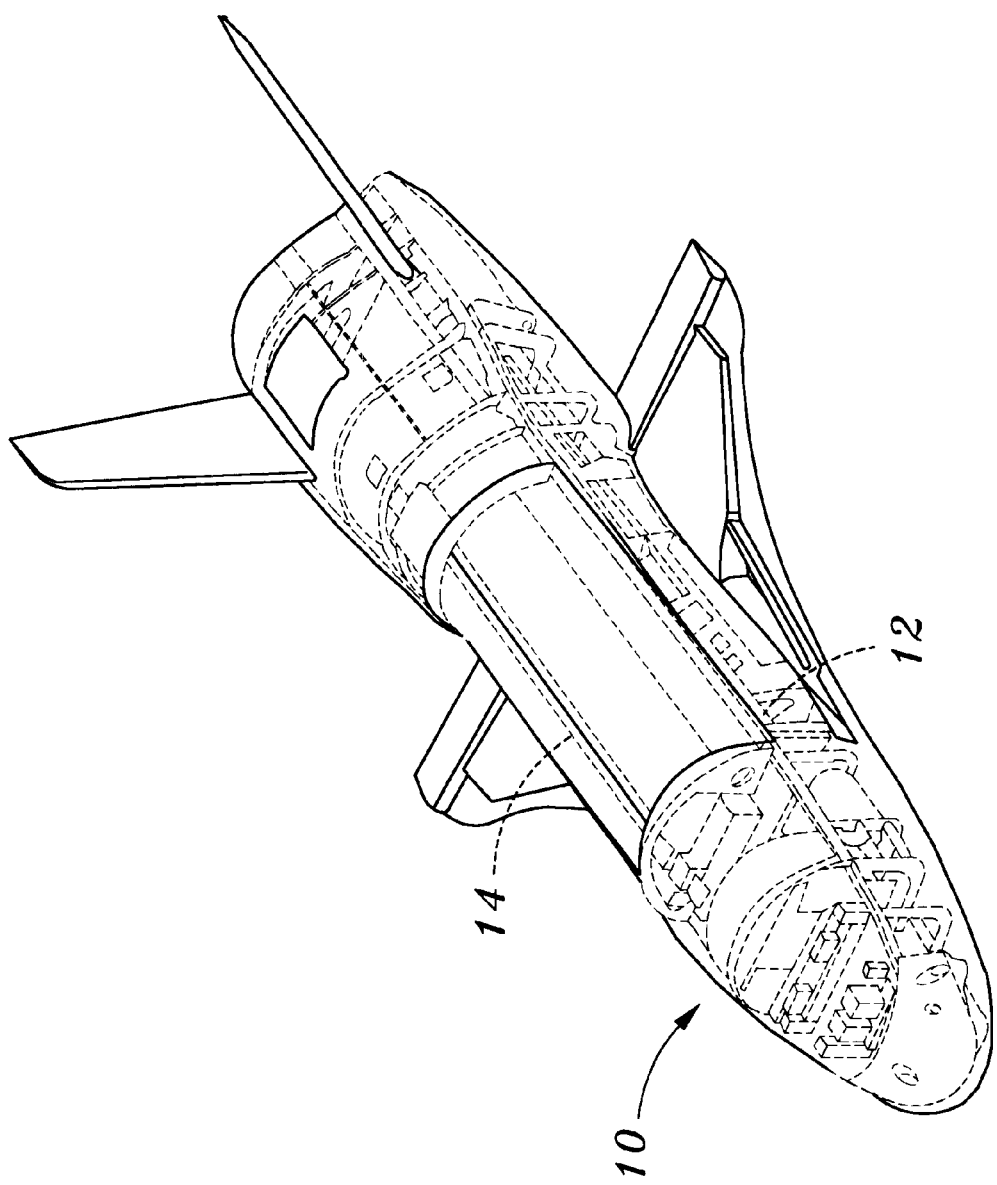
FIG. 3 is a view similar to FIG. 2, but with the solar array in its stowed configuration.

Referring to the accompanying drawings and initially to FIGS. 1 through 3, it will be seen that a reusable space vehicle 10 has a payload bay 12 in which a bi-fold solar array assembly 14 may be stowed and from which the array assembly may be deployed. In the stowed configuration (as seen generally in FIG. 3), the array assembly 14 may be fully folded in an arched configuration which substantially conforms to the shape of the payload bay doors 26 which enclose the array assembly 14 during takeoff, orbital insertion, and vehicle return and landing operations. In the deployed configuration, as shown generally in FIGS. 1 and 2, the array assembly 14 has been removed from the payload bay 12, and can be extended off to the side of the vehicle 10 on a deployment arm 16 where a plurality of solar array panels 18, 20, 22 and 24 have been unfolded and together rotated to present maximum surface area to incident sunlight.

Figure 4:
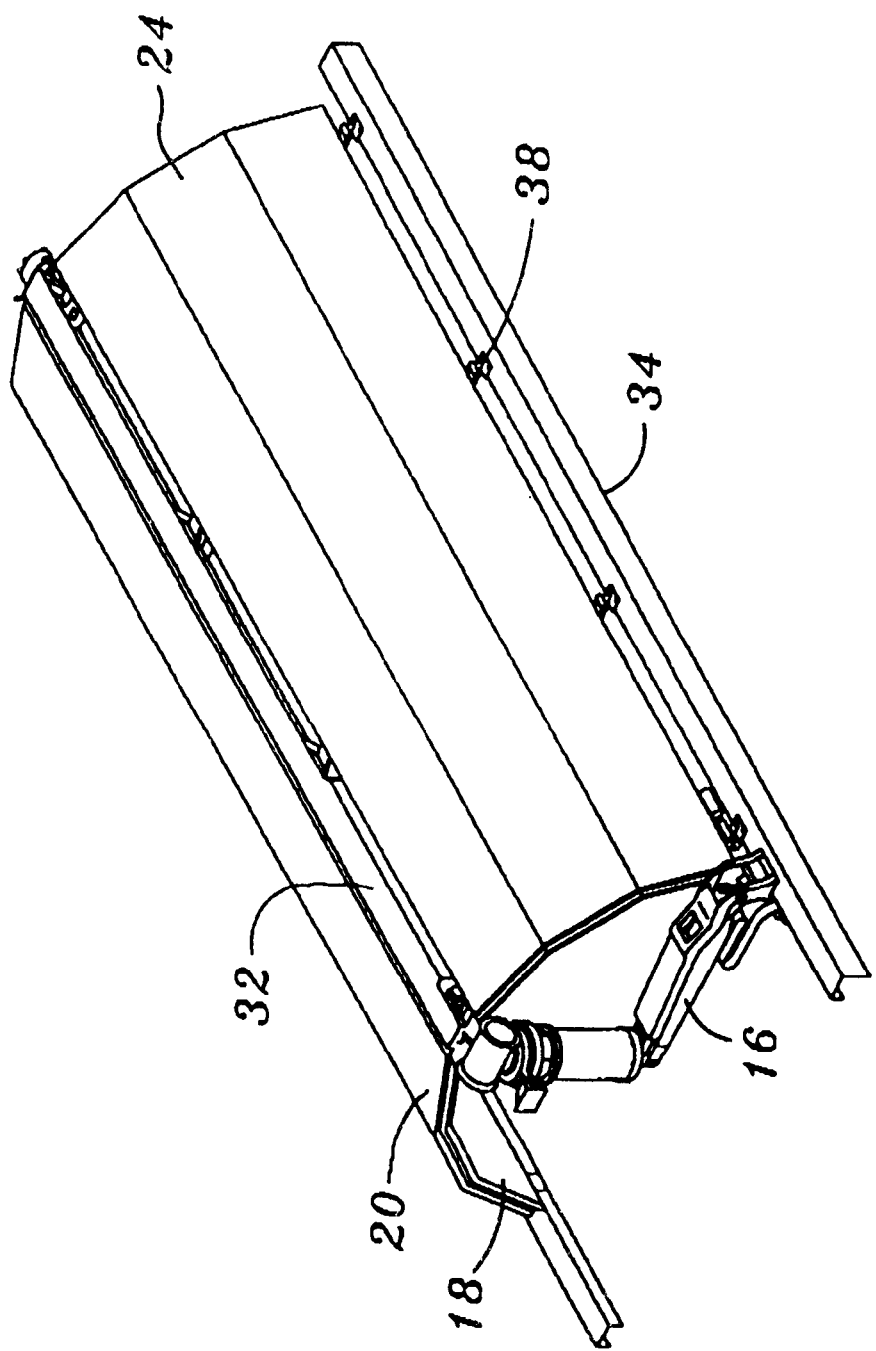
FIG. 4 is an enlarged view of the solar array in its stowed configuration.
Figure 5:
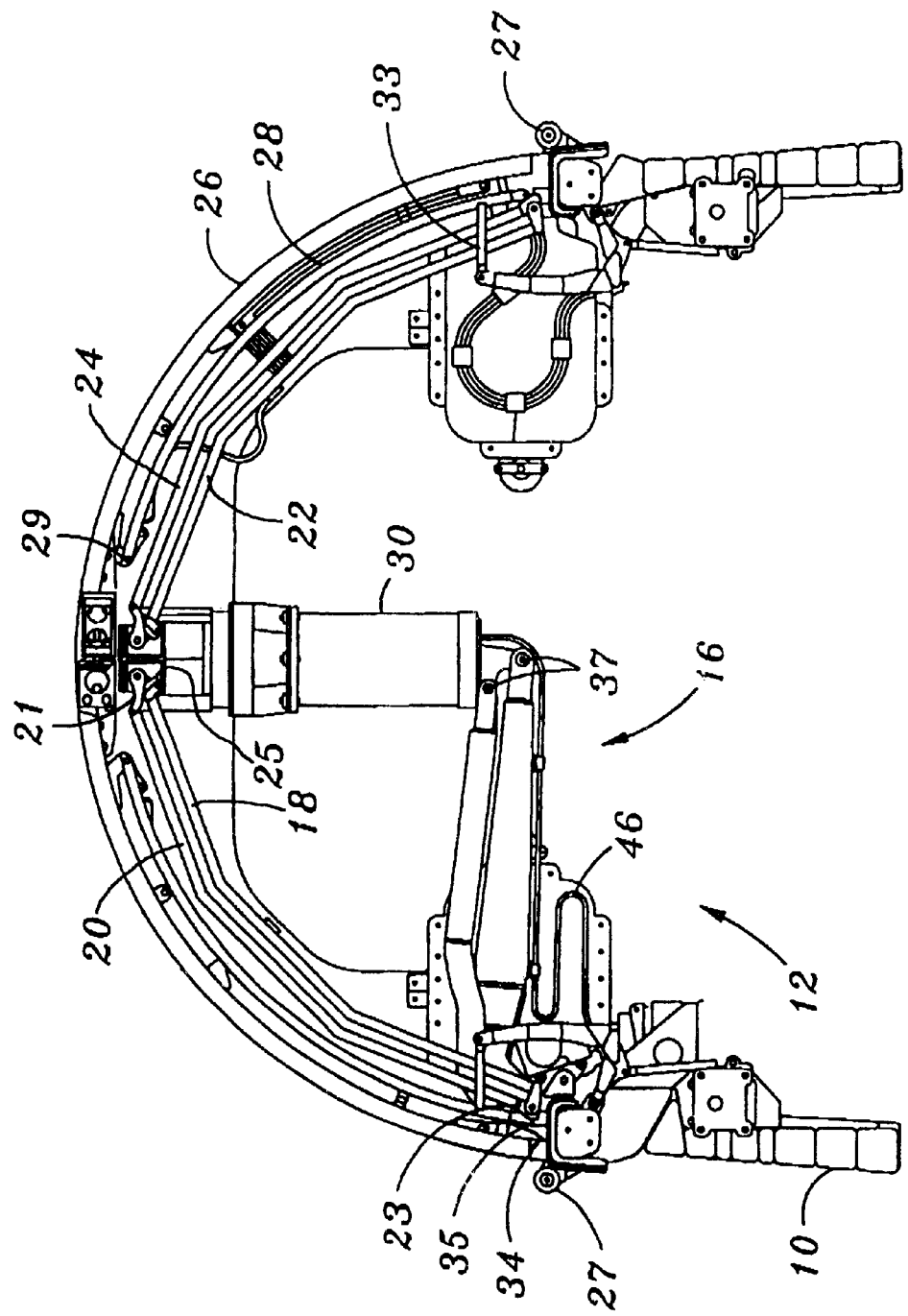
FIG. 5 is a cross-sectional view of the solar array stowed in a payload bay of a space vehicle.
Figure 6:
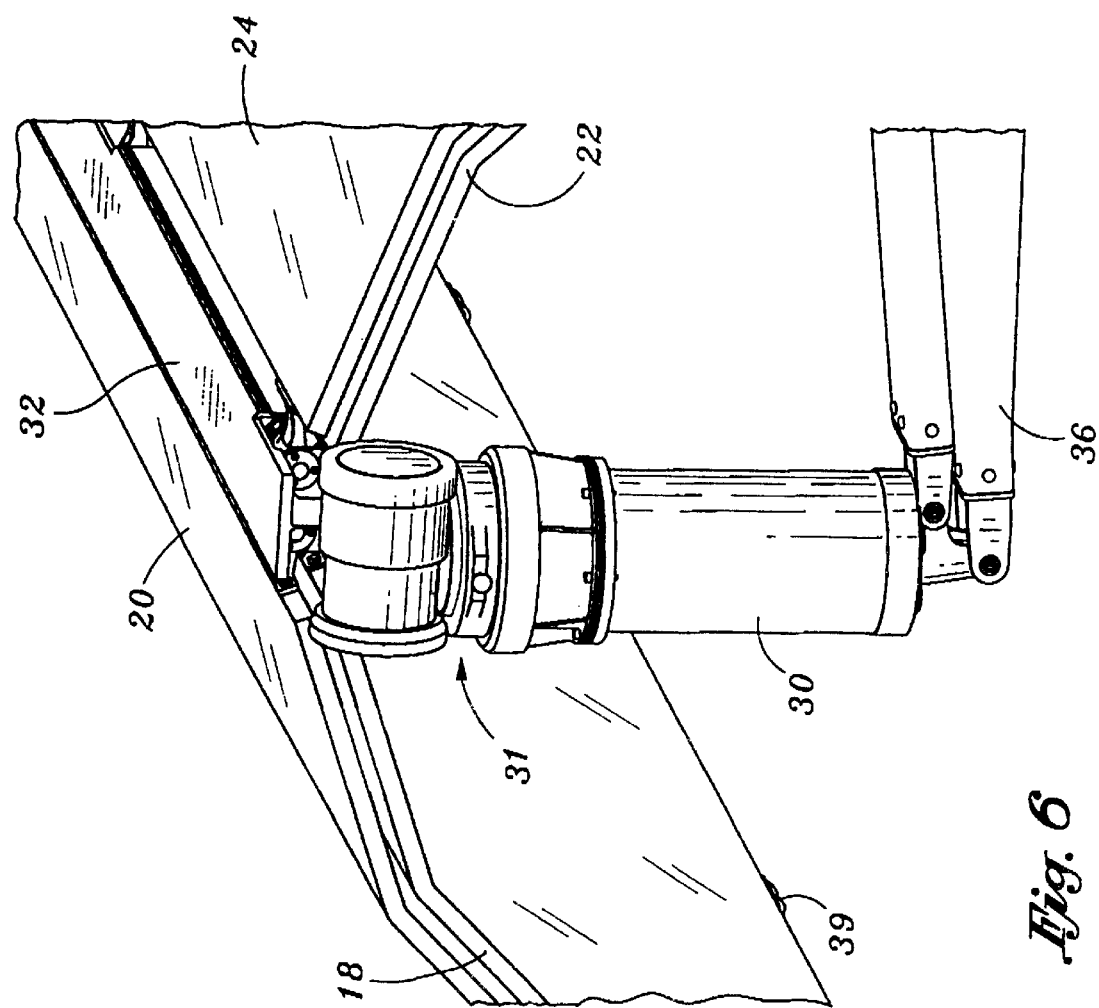
FIG. 6 is a view of the array/arm interface in the stowed configuration.

Reference will now be made to FIGS. 4 through 6 for a more detailed description of one embodiment in the stowed configuration. As shown in FIGS. 4 through 6, the solar array assembly 14 may comprise a plurality of folded panels 18, 20, 22 and 24 of which panels 18 and 20 can be outboard panels and panels 22 and 24 can be inboard panels. In the stowed configuration, the outboard panels 18 and 20 may be folded under the inboard panels 22 and 24 and all four panels may be stowed immediately below payload bay doors 26. An arm assembly (or upper arm) 36 (basic IV bar mechanism) is attached to a deployment wrist arm assembly 30 at an elbow joint 37. Wrist assembly 30 can be affixed to one end of a structural boom or center beam assembly 32.

The solar array panel to panel assembly 14 may comprise the two inboard panels 22 and 24 which are respectively affixed along their entire lengths to one edge of beam assembly 32 by respective hinge points 21 (four per side). The inboard panels 22, 24 and outboard panels 18, 20 on each side of beam assembly 32 may be hinged by hinge points 23 immediately above respective sills 34. The outboard panels 18 and 20 have passive rollers 39 that trap the outboard panels into I-Beam passive snubbers 25 for closed position and positive restraint. The panels may employ multiple Graphite-Cyanate Esterface sheets over aluminum honeycomb cores with solar cells bonded on a kapton surface. The outboard panels may employ four equally spaced rollers 39 which rest in V-guide type passive restraints 38 when the array assembly 14 is stowed (four starboard and four port side). A plurality of passive restraints 38 can be at spaced locations along the sills 34 to positively secure the array in the stowed configuration using the door and radiator snubbers. Doors 26 can apply a modest compressive force on the panels to trap the rollers in the V-guides. The plurality of passive restraints 38 (8 total; 4 on each side) may support the panels on the sills 34 without the need for active restraints.

The array assembly 14 may be stowed immediately adjacent payload bay doors 26 which may be selectively opened along door hinge lines 27 by a door actuator 33. A pair of deployable radiators 28 which carry the rubber bumpers that cushion between the door and SAA panels, is hingedly attached to the doors 26 at hinge points 29 for deployment in the manner shown in FIG. 2.

A forward passive restraint at the Bi-Axial drive and an aft capture latch both have a V-guide feature in an axis orthogonal to the snubbers on the sill. The doors push downward from the centerline latch beams to trap the SAA shear pins (stowed configuration) in the guides supporting: (1) X, Y & Z loads at the Bi-axial drive; and (2) Y & Z loads out at the capture latch Beam tip fitting. The V-guides on the sill support radial loads relative to the curvature of the payload bay doors.

Figure 8:
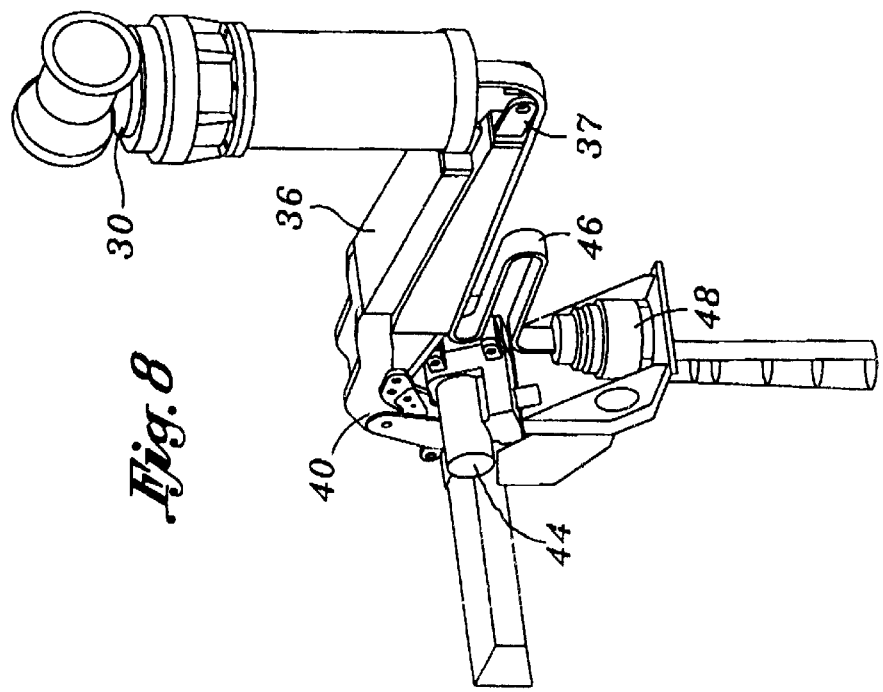
FIG. 8 is an enlarged view of the shoulder fitting of FIG. 9, but taken from an alternative direction.
Figure 7:
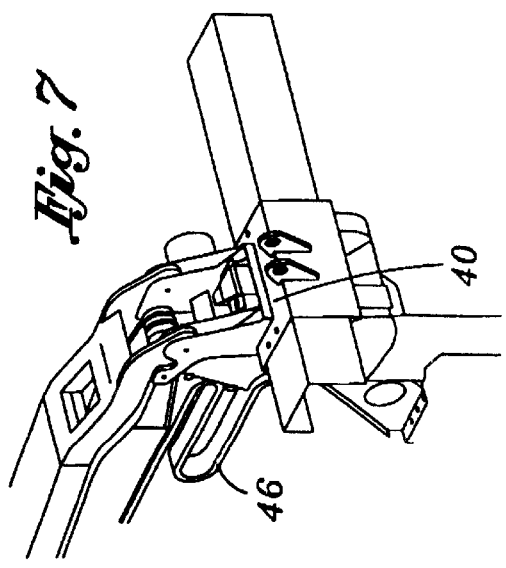
FIG. 7 is an enlarged view of a shoulder fitting and separation joint of the invention.
Figure 9:
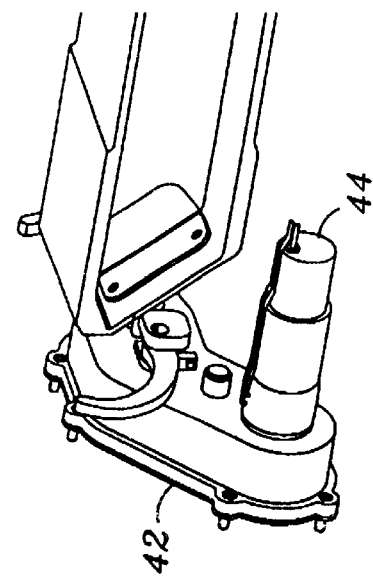
FIG. 9 is an enlarged view of a beam capture latch of the invention.

The fore arm assembly 30 mentioned above provides two distinct orthogonal axes of rotation through an alpha drive 35 and a beta drive 31. The axis of Alpha drive 35 may be perpendicular to the boom 32 and to the plane of the boom 32. The axis of Beta drive 31 may also be perpendicular to the boom 32, but parallel to the plane of the boom 32, as seen best in FIG. 6. Fore arm assembly 30 can be attached through a hinged elbow joint 37 to a four bar link mechanism 36 which deploys in a two dimensional plane, with the wrist rotating 90 degrees relative to the fore arm. The fore arm rotates approximately 180 degrees from its stowed position, and is, in turn, secured to a sill 34 by a shoulder fitting 40 seen best in FIGS. 7 and 8. A low force gear box 42 and actuator 44 can provide the mechanical force to control arm 16 to raise and rotate the array assembly 14 into the position shown in FIG. 2 where the outboard panels 18 and 20 are rotated about respective inboard panels 22 and 24 into the fully deployed configuration of FIG. 10. A flexible array umbilical cable 46 can provide for electrical interface through a connector 48.

FIGS. 11–15 illustrate in sequence, various intermediate steps in the deployment of the illustrated embodiment between the stowed configuration of FIG. 3 and the fully deployed configuration of FIGS. 1 and 2. In FIG. 11, arm 16 has just begun to lift the beam 32 by a shoulder rotation of 30 degrees, for example, and thus the entire array 14, out of the payload bay 12. In FIG. 12, the panel beam 32 bends at the biaxial drive to rotate the aft end of array 14 completely out of the payload bay. After partial rotation of the beta joint, the alpha joint begins to rotate simultaneously with the beta joint. When the alpha joint begins to rotate, the shoulder joint begins the deployment. In FIG. 13, the arm 16 and drivers 31 and 35 have translated and rotated boom 32 until the array 14 is fully clear of the payload bay 12. The outboard panels 18 and 20 have begun to unfold from the inboard panels 22 and 24, respectively. In FIG. 14, the aft end of boom 32 has been rotated away from the aft end of the vehicle and in FIG. 15 the boom is made substantially perpendicular to the vehicle on the port side while the panels have substantially completed unfolding to expose the full surface area of panels. Throughout the sequence of FIGS. 11–15, the starboard payload bay door 26 and radiator 28 are fully opened. However, on the port side, while the payload bay door 26 is opened, the radiator 28 remains in its unopened configuration until the array 14 has been fully opened outside the port side of the vehicle. Once the array has been fully removed from the payload bay 12 and unfolded, arm 16 including drivers 31 and 35 may be utilized to position the array for maximum incident sunlight interception.

It will now be understood that the preferred embodiment of the present invention provides a 6DOF deployable/stowable multi-use solar array assembly for a low earth orbit space vehicle and that occupies relatively little volume in the stowed configuration. Significantly, the array assembly of the invention provides a plurality of non-flexible solar panels which utilize a bi-fold process for deployment and stowage thereby overcoming the deficiencies of the prior art.

Having thus disclosed an illustrative example of the invention, it will be understood that various modifications and additions are contemplated, and thus the scope hereof is to be limited only by the appended claims and their equivalents.

We claim:

1. A solar cell array assembly for deployment from an arm of a vehicle having a payload bay selectively enclosed by at least one payload bay door; the array assembly comprising:
   a plurality of solar cell panels, at least two of which are hingedly attached to one another for folding one under the other for stowing said array assembly in said payload bay; and
   a deployment arm attached to at least one of said panels and to said payload bay and having a plurality of axes of motion for selectively orienting said panels outside said payload bay.

2. The solar cell array assembly recited in claim 1 wherein said panels are shaped to be substantially congruent to said payload bay door and are positioned to be compressed by said door when said array is in the stowed configuration.

3. The solar cell array assembly recited in claim 1 further comprising an elongated structural boom extending along an edge of at least one of said panels.

4. The solar cell array assembly recited in claim 1 wherein said deployment arm comprises a shoulder attached to said payload bay, an upper arm connected to said shoulder and terminating in an elbow joint and a fore arm.

5. The solar cell array assembly recited in claim 4 wherein said fore arm comprises at least two independent rotational drives for rotating said panels around at least two orthogonal axes.

6. The solar cell array assembly recited in claim 1 comprising four of said panels, two of said panels connected on each of their respective facing edges to a symmetrically located, elongated structural boom extending along substantially the entire length of said panels.

7. The solar cell array assembly recited in claim 6 wherein said boom-connected panels are above the remaining two folded panels when said array assembly is stowed.

8. The solar cell array assembly recited in claim 6 wherein said deployment arm is connected to an end of said boom.

9. The solar cell array assembly recited in claim 8 wherein said deployment arm comprises a shoulder attached to said payload bay, an upper arm connected to said shoulder and terminating in an elbow joint and a fore arm.

10. The solar cell array assembly recited in claim 6 wherein said panels are shaped to be substantially congruent to said payload bay door.

11. A multiple-panel, foldable solar cell array assembly that is retractable for being stowed in the payload bay of a space vehicle in a folded configuration and extendable for deployment outside the vehicle in an unfolded configuration; the array assembly comprising:
   a structural boom connected between two of said panels; and
   a deployment arm connected to said boom for selectively deploying said panels;
   said panels being arched to conform to the shape of said space vehicle payload bay.

12. The solar cell array assembly recited in claim 11 wherein said deployment arm comprises a shoulder attached to said payload bay, an upper arm connected to said shoulder and terminating in an elbow joint and a fore arm.

13. The solar cell array assembly recited in claim 12 wherein said fore arm comprises at least two independent rotational drives for rotating said panels around at least two orthogonal axes.

14. The solar cell array assembly recited in claim 11 comprising four of said panels, two of said panels connected on each of their respective facing edges to a symmetrically located, elongated structural boom extending along substantially the entire length of said panels.

15. The solar cell array assembly recited in claim 14 wherein said boom-connected panels are above the remaining two folded panels when said array assembly is stowed.

16. The solar cell array assembly recited in claim 11 wherein said deployment arm is connected to an end of said boom.

17. A solar cell array assembly for deployment from an arm of a vehicle having a payload bay selectively enclosed by at least one payload bay door; the array assembly comprising:
   a plurality of solar cell panels, at least two of which are hingedly attached to one another for folding one under the other for stowing said array assembly in said payload bay; and
   a deployment arm attached to at least one of said panels and to said payload bay and having a plurality of axes of motion for selectively orienting said panels outside said payload bay;
   said panels being shaped to be substantially congruent to said payload bay door;
   an elongated structural boom extending along an edge of at least one said panels;
   said deployment arm having a shoulder attached to said payload bay, an upper arm connected to said shoulder and terminating in an elbow joint and a fore arm;
   said fore arm having at least two independent rotational drives for rotating said panels around at least two orthogonal axes; and
   wherein said deployment arm is connected to an end of said boom.

18. A reusable space vehicle having a payload bay selectively enclosed by at least one payload bay door, the vehicle comprising:
   a deployable solar cell array assembly having a plurality of foldable panels shaped to substantially conform to the shape of said at least one payload bay door; and
   a deployment arm connected at one end at a hinge line of said payload bay door and connected at another end to said panels, said deployment arm having multiple degrees of freedom of motion to lift and rotate the panels out of the payload bay and orient the panels to be perpendicular to incident sunlight;
   wherein said deployment arm comprises a fore arm having a pair of independent rotational drives having orthogonal axes of rotation.

19. The space vehicle recited in claim 18, further comprising an elongated structural boom to which at least two of said panels are affixed, said deployment arm being connected to said panels through said boom.

20. A reusable space vehicle having a payload bay selectively enclosed by at least one payload bay door, the vehicle comprising:
   a deployable solar cell array assembly having a plurality of foldable panels shaped to substantially conform to the shape of said at least one payload bay door; and
   a deployment arm connected at one end at a hinge line of said payload bay door and connected at another end to said panels, said deployment am, having multiple degrees of freedom of motion to lift and rotate the panels out of the payload bay and orient the panels to be perpendicular to incident sunlight;
   wherein said at least one payload bay door is configured relative to said panels to apply a selective load on said panels when said array assembly is in the stowed configuration in said payload bay.

21. The space vehicle recited in claim 20, further comprising an elongated structural boom to which at least two of said panels are affixed, said deployment arm being connected to said panels through said boom.

22. A deployment arm assembly for interconnecting a foldable solar array assembly and a payload bay of a space vehicle, the array assembly being selectively stowed in a shape to substantially conform to the payload bay and being selectively deployed outside the payload bay for receiving incident sunlight; the arm assembly comprising:
   a shoulder connected to the payload bay;
   an articulatable upper arm connected to said shoulder and terminating in an elbow joint; and
   a fore arm extending from said elbow joint and connected to said solar array assembly;
   said fore arm having at least two drives for rotating said array assembly about two orthogonal axes of rotation.

23. A method for deploying a stowable solar cell array from the payload bay of a reusable low earth orbiting space plane with minimal usage of payload bay volume; the method comprising the steps of:
   a) configuring said array as a plurality of foldable outboard panels hingedly connected to a plurality of foldable inboard panels;
   b) shaping said foldable outboard and inboard panels to substantially conform to the outer perimeter of said payload bay in the stowed configuration;
   c) connecting said panels to said payload bay through an extendable and articulatable arm assembly for selectively positioning said panels;
   d) attaching each of said inboard panels to an elongated structural boom; and
   e) affixing said arm assembly to an end of said boom.

24. The method recited in claim 23, further comprising the step of:
   f) configuring said arm assembly to provide a plurality of rotational drives having respective axes of rotation that are orthogonal to one another.

25. A method for deploying a stowable solar cell array from the payload bay of a reusable low earth orbiting space plane with minimal usage of payload bay volume; the method comprising the steps of:
   a) configuring said array as a plurality of foldable outboard panels hingedly connected to a plurality of foldable inboard panels;
   b) shaping said foldable outboard and inboard panels to substantially conform to the outer perimeter of said payload bay in the stowed configuration;
   c) connecting said panels to said payload bay through an extendable and articulatable arm assembly for selectively positioning said panels;
   d) enclosing said payload bay with hinged doors; and
   e) employing said hinged doors to passively restrain said array panels when said array is stowed.

26. The method recited in claim 25 further comprising the step of:
   f) providing passive restraints to secure said panels in said payload bay when said array is stowed.

27. The method recited in claim 25 further comprising the step of:
   f) configuring said arm assembly to provide a plurality of rotational drives having respective axes of rotation that are orthogonal to one another.

28. A reusable space vehicle having a payload bay selectively enclosed by at least one payload bay door, the vehicle comprising:
   a deployable solar cell array assembly having a plurality of foldable panels shaped to substantially conform to the shape of said at least one payload bay door; and
   a deployment arm connected at one end at a hinge line of said payload bay door and connected at another end to said panels, said deployment arm having six degrees of freedom of motion to lift and rotate the panels out of the payload bay and orient the panels to be perpendicular to incident sunlight.

29. A method for deploying a stowable solar cell array from the payload bay of a reusable low earth orbiting space plane with minimal usage of payload bay volume; the method comprising the steps of:
   a) configuring said array as a plurality of foldable outboard panels hingedly connected to a plurality of foldable inboard panels;
   b) enclosing said payload bay with at least one hinged door;
   c) shaping said foldable outboard and inboard panels to substantially conform to the outer perimeter of said at least one hinged door in the stowed configuration; and
   d) connecting said panels to said payload bay through an extendable and articulatable arm assembly for selectively positioning said panels.

* * * * *